Jan. 14, 1941.   R. S. SANFORD   2,228,612
VEHICLE CONTROL MECHANISM
Filed Oct. 28, 1937
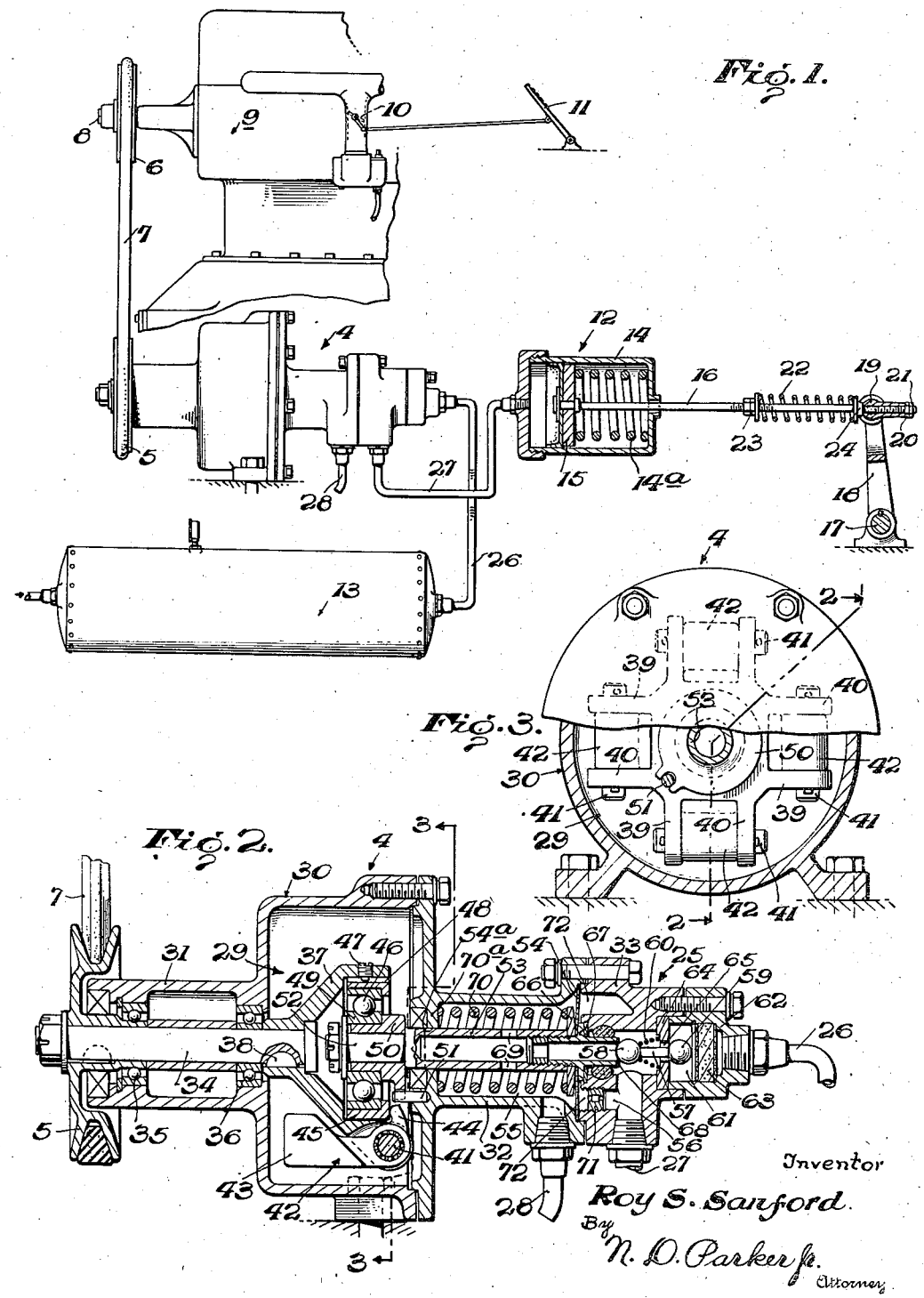
Inventor
Roy S. Sanford
By N. D. Parker Jr.
Attorney Patented Jan. 14, 1941

2,228,612

UNITED STATES PATENT OFFICE 2,228,612

VEHICLE CONTROL MECHANISM

Roy S. Sanford, Pittsburgh, Pa., assignor to Bendix-Westinghouse Automotive Air Brake Company, Pittsburgh, Pa., a corporation of Delaware Application October 28, 1937, Serial No. 171,570

8 Claims. (Cl. 192—91)

This invention relates to motor vehicle control mechanism and more particularly to a device for automatically controlling the engaging and disengaging operations of the vehicle clutch.

One of the objects of the present invention is to provide a novel arrangement for automatically controlling the operation of a motor vehicle clutch whereby the operator will be relieved of the necessity of operating the usual clutch pedal during starting of the vehicle and the shifting of gears.

Another object of the invention is to provide a novel construction of the above character wherein the control of the vehicle clutch may be effected through operation of the engine accelerator pedal.

Still another object is to control the clutch by a fluid pressure motor and to provide a valvular mechanism for the motor which will function in such a manner that, when the engine is idling, the clutch will be disengaged, whereas a slight increase of engine speed will so operate the valvular mechanism that the fluid motor controlled thereby will permit gradual re-engagement of the clutch.

A further object is to provide, in a device of the foregoing character, a novel arrangement, drivably connected with the vehicle engine, for operating the valvular mechanism whereby gradual engagement of the clutch may be readily controlled by operation of the engine accelerator pedal.

A still further object is to provide, in the suggested structure, a novel and compact arrangement of parts which will enable graduated and efficient power operation of the vehicle clutch under the direct supervision of the vehicle accelerator pedal, such a construction offering a very satisfactory solution to the problem of simplification of vehicle controls.

Other objects and novel features of the invention will appear more fully hereinafter from a consideration of the following detailed description when taken in connection with the accompanying drawing illustrating one form of the invention. It is to be expressly understood, however, that the drawing is employed for purposes of illustration only and is not to be taken as a definition of the limits of the invention, reference being had for this purpose to the appended claims.

In the drawing, wherein similar reference characters refer to similar parts throughout the several views:

Fig. 1 is a diagrammatic view, partly in section, of a vehicle control mechanism constructed in accordance with the present invention;

Fig. 2 is an axial sectional view of the centrifugally-controlled valvular mechanism of Fig. 1 and taken along lines 2—2 of Fig. 3, and Fig. 3 is a partial sectional view of the centrifugally-operated mechanism taken along lines 3—3 of Fig. 2.

Referring more particularly to Fig. 1, the present invention is illustrated therein as including a centrifugally-operable valvular mechanism 4, drivably connected, as by means of pulleys 5, 6 and belt 7, with a suitable engine-driven shaft 8. In accordance with changes in speed of the vehicle engine 9, by variation of the position of carburetor throttle valve 10 through actuation of accelerator pedal 11, the valvular mechanism 4 controls the communication between clutch motor 12 and reservoir 13.

As shown, the clutch motor 12 comprises a cylinder 14 having a piston 15 therein, the latter being provided with a rod 16 preferably connected to a clutch-operating shaft 17 in such a manner as to avoid any loading of the release bearing of the vehicle clutch when the latter is engaged. To this end, the shaft 17 has an arm 18 secured thereto, the latter being provided at its upper end with a socket portion or trunnion 19 adapted to slidably receive the threaded end of the piston rod. The latter is provided with a pair of nuts 20 and 21 so positioned with respect to portion 19 as to contact the latter when the parts are in normal position where the vehicle clutch is engaged by the usual return springs associated therewith, such contact being assured by a spring 14a in cylinder 14. In order to connect the piston 15 to the clutch-operating arm 18, a spring 22 is confined between a collar 23, secured to rod 16, and a collar 24, loose on the rod and abutting the trunnion 19 of the arm 18. Such an arrangement forms a cushioned or resilient connection between the clutch motor and clutch-operating arm.

In order to control the application of fluid pressure to the clutch motor and the exhaust of said pressure therefrom, the valvular mechanism 4 is provided, and, as shown, is so constituted as to be readily responsive to changes in the speed of the vehicle engine. By such an arrangement, the vehicle clutch is disengaged when the engine is idling and may be smoothly engaged after a change in the gear ratio of the vehicle transmission has been effected, by merely increasing the engine speed through movement of accelerator 11. In the form of the invention illustrated, the valvular mechanism includes a valve 25 for controlling the flow of fluid pressure from the reservoir 13 to the motor 12 by way of conduits 26 and 27, while controlling also the exhaust of such pressure from the motor to an exhaust passage 28. The valve 25 is actuated by a centrifugally-operable mechanism 29 which, as heretofore stated, is controlled from a suitable shaft or other member driven by the engine.

Referring more particularly to Fig. 2, the valve mechanism 4 includes a casing 30 including a plurality of sections 31, 32 and 33, the section 31 housing the centrifugally-operable mechanism. The latter includes a shaft 34, suitably rotatably mounted in the casing, as by means of bearings 35 and 36, and provided at the outer end thereof with the pulley 5, securely attached thereto. The opposite end of the shaft is provided with a rotor 37, secured to the shaft as by means of a key 38, the rotor having a plurality of sets of arms 39, 40 for receiving pivot pins 41 carrying weighted levers 42. The latter are rotatably mounted on the pins 41 and comprise a weighted arm 43 and an arm 44 adapted to bear against the outer race 45 of bearing 46. The latter, as shown, is so mounted with respect to the rotor as to be capable of limited axial movement with respect thereto, this movement being permitted through the cooperation of a screw 47 carried by the rotor, and a slot 48 formed in the race 45. The screw 47, however, insures rotation of the bearing race 45 with the rotor. The inner race 49 of the bearing is non-rotatably mounted by means of a sleeve 50 which is secured to the casing 32 by a pin 51, the bearing 46 and sleeve 50 serving to pilot the reduced end 52 of a valve-operating member 53, slidably mounted in the casing at 54a. From the foregoing, it will be readily understood that, during rotation of shaft 34, rotor 37 will also be rotated and the weighted members 42 will, in response to centrifugal force, rotate about the pivot pins 41 and cause movement of the valve-operating member to the left, as viewed in Fig. 2, through the action of lever arms 44 cooperating with the assembly constituted by races 45 and 49 together with bearing 46 and sleeve 50.

The valve mechanism 25 more particularly includes a pressure-responsive member such as a diaphragm 54 which is clamped between casing sections 32 and 33 and which serves to divide the casing into exhaust and outlet chambers 55 and 56 respectively. A valve member 57, having exhaust and intake heads 58 and 59 is provided for controlling the fluid flow, the valve member being resiliently mounted through spring 60 and having its intake head positioned within intake chamber 61, formed by a cap 62 secured to casing portion 33. The conduit 26 leading from the reservoir 13 connects with cap 62 and conducts fluid pressure to chamber 61 through a suitable filter element 63. A partition 64 between chambers 61 and 56 forms an intake valve seat 65 for intake valve 59 as well as constituting a support for spring 60.

In order to operate the valve 57 by the sliding movement of member 53, the latter is secured to the diaphragm 54 by threaded members 66 and 67 disposed on opposite sides of the diaphragm. The member 67 is formed as a hollow member having an end 68 constituting an exhaust valve seat for cooperation with valve head 58. When seat 68 is removed from valve head 58, the outlet chamber 56 is connected with the exhaust chamber 55 through member 67 and ports 69 positioned in member 53. On the other hand, when members 53 and 67 are moved to the position shown, seat 68 engages valve head 58 and moves the valve 57 to such a position that intake valve 59 is opened thereby permitting fluid pressure to flow to the clutch motor by way of chamber 56 and conduit 27.

Means are provided for maintaining the valve mechanism 25 in such position during idling of the vehicle engine that the clutch will be disengaged. For this purpose, a spring 70 is confined between an inturned flange 70a of casing section 32, and diaphragm 54, the tension thereof being such that, during the aforesaid condition of operation, the diaphragm and parts secured thereto will be moved to the right, as viewed in Fig. 2, a sufficient distance to effect contact between the seat 68 and valve head 58 and to move the intake valve 59 off its seat. The clutch will thereupon be disengaged in the manner set forth hereinbefore.

During operation, as will appear above, the vehicle clutch is disengaged when the engine is running at normal idling speed. A desired gear relation may now be effected and, upon increase of engine speed due to operation of the accelerator pedal 11, the weights 43 will move about the pivots 41 and effect movement of the bearing 46 and valve-operating member 53 toward the left, as viewed in Fig. 2. This action will serve to move member 67 and diaphragm 54 to the left, aided by the pressure of the fluid in outlet chamber 56, exerted against the diaphragm via a restricted choke 71 connecting the outlet chamber with a diaphragm chamber 72. Under these conditions, as the engine speed increases, the valve head 59 will be moved slowly to its seat, under the action of spring 60, thus cutting off the supply of fluid pressure to the clutch motor. After the intake valve has been closed, the member 67 will move gradually away from the exhaust valve 58, in order to connect the clutch motor to the exhaust conduit 28 by way of member 67, ports 69 and chamber 55. Thus the fluid pressure within the clutch motor will be gradually exhausted in proportion to the increase in speed of the engine, and the clutch permitted to smoothly engage through the action of the return springs associated therewith.

It will be observed that, by providing the diaphragm 54, subjected at all times to the pressure of the fluid within the clutch motor through connected chambers 56 and 72, the valve mechanism is capable of lapping, at a particular motor speed, in order to maintain a predetermined pressure within the clutch motor. This will be readily understood when it is considered that, as the fluid pressure within chamber 56 is exhausted, by reason of the opening of the exhaust valve 58, the pressure within diaphragm chamber 72 is reduced, thereby permitting spring 70 to become effective to move member 67 to the right, as viewed in Fig. 2, to contact and close the exhaust valve. Thus the valve mechanism is subjected to the combined control of the vehicle engine and the fluid pressure in the clutch motor, the arrangement securing an unusually precise automatic control of the vehicle clutch and permitting a smooth and graduated engagement thereof.

While one form of the invention has been illustrated and described herein, it is to be understood that the same is not limited thereto, but may be embodied in a variety of mechanical expressions, as well understood by those skilled in the art, without departing from the spirit of the invention. Reference will, therefore, be had to the appended claims for a definition of the limits of the invention.

What is claimed is:

1. A motor vehicle having an engine and a clutch-controlling member, a fluid motor operatively connected with the member for controlling clutch-disengaging and engaging movements thereof, a source of fluid pressure, and a governor-controlled valve mechanism for controlling the application and exhaust of fluid pressure to and from said motor comprising a casing, exhaust and intake valves mounted therein, a valve-operating member having an exhaust valve seat formed on one end, means for mounting said last named member for sliding movement in the casing, means carried by said casing and having a connection with said last named member for moving the latter in response to changes of pressure in said motor and centrifugally-responsive means operatively connected with the valve-operating member for moving the latter in response to changes in engine speed.

2. A motor vehicle having an engine and a clutch-controlling member, a fluid motor operatively connected with the member for controlling clutch-disengaging and engaging movements thereof, a source of fluid pressure, and a governor-controlled valve mechanism for controlling the application and exhaust of fluid pressure to and from said motor comprising a casing, a combined exhaust and intake valve assembly mounted therein, a valve-operating member slidably mounted in said casing and provided with an exhaust valve seat, resilient means associated with said last named member and tending to urge the same to a position where the exhaust valve seat contacts the exhaust valve portion of said valve assembly, means connected to said valve-operating member and responsive to the pressure in said motor for moving the member in opposition to the action of said resilient means, and means responsive to the speed of said engine and operatively connected with said valve-operating member for moving the latter in opposition to the action of said resilient means.

3. A governor-controlled valve mechanism comprising interconnected exhaust and intake valves, resilient means tending to close the intake valve, a slidable valve-operating member one end of which is formed as an exhaust valve seat, a second resilient means associated with said member and normally effective to close the exhaust valve and open the intake valve against the action of the first resilient means, a rotatable power-driven shaft, a plurality of weighted members carried by said shaft and movable in response to centrifugal force, means connecting said weighted members and valve-operating member whereby movement of the former in response to centrifugal force will move the valve-operating member against the action of said second resilient means, and pressure-responsive means having a connection with said valve-operating member for assisting said centrifugal force responsive means in moving said valve-operating member.

4. A governor-controlled valve mechanism comprising interconnected exhaust and intake valves, resilient means tending to close the intake valve, a valve-operating member one end of which is formed as an exhaust valve seat, a second resilient means associated with said member and normally effective to close the exhaust valve and open the intake valve against the action of the first resilient means, centrifugally-operated means for moving said valve-operating member against the action of said second resilient means, and pressure-responsive means associated with said valve-operating member and cooperating with said centrifugally-operated means for moving said member.

5. In a vehicle having an engine, a clutch-controlling member and a source of fluid pressure, the combination with said member, of a fluid motor for controlling clutch-disengaging and engaging movements thereof, and valve means for controlling communication between said source and motor comprising a casing, a diaphragm therein dividing the casing into outlet and exhaust chambers, an intake valve controlling the communication between the source and outlet chamber, an exhaust valve controlling the communication between the outlet and exhaust chambers, a valve-operating member having one end thereof connected to said diaphragm, resilient means associated with said diaphragm and normally maintaining said valve-operating member in contact with the exhaust valve member, and centrifugally-actuated means driven by said engine for moving said valve-operating member against the action of said resilient means.

6. In a vehicle having an engine, a clutch-controlling member and a source of fluid pressure, the combination with said member, of a fluid motor for controlling clutch-disengaging and engaging movements thereof, and valve means for controlling communication between said source and motor comprising a casing, a diaphragm therein dividing the casing into outlet and exhaust chambers, means for connecting said motor and outlet chamber, an exhaust valve positioned in said outlet chamber, an intake valve connected with the exhaust valve and controlling the communication between the source and outlet chamber, a valve-operating member having a bore for connecting said outlet and exhaust chambers, means for connecting the diaphragm to the valve-operating member adjacent one end of the latter, resilient means associated with the diaphragm and normally serving to move the valve-operating member into contact with the exhaust valve to close off communication between the outlet and exhaust chambers and to move the intake valve to establish communication between the source and outlet chamber whereby fluid pressure is conducted to the motor, and means driven by said engine and responsive to the speed thereof for operating said valve-operating member against the action of said resilient means to establish communication between the outlet and exhaust chambers whereby fluid pressure from said motor is exhausted and the clutch-controlling member is moved to clutch-engaged position.

7. A motor vehicle having an engine and a clutch-controlling member, a fluid motor operatively connected with the member for controlling clutch-disengaging and engaging movements thereof, a source of fluid under pressure, valve means for controlling the application and exhaust of fluid pressure to and from said motor, means responsive to the speed of said engine for controlling said valve means, and a pressure-responsive member operatively connected with said second named means and subjected to the pressure of the fluid in said motor at all times regardless of engine speed for modifying the valve-controlling action of said second named means.

8. The combination in a motor vehicle having an engine, a clutch, a clutch-controlling member, a fluid motor operatively connected therewith for controlling clutch-disengaging and engaging movements thereof, a source of fluid pressure and valve means for controlling the application and release of fluid pressure to and from said motor, of means responsive to engine speed for controlling said valve means, and means operatively connected to said speed-responsive means and responsive to the pressure of the fluid in said motor at all times regardless of engine speed for modifying the valve-controlling action of the engine speed-responsive means.

ROY S. SANFORD.